United States Patent [19]

Cann

[11] Patent Number: 5,071,810

[45] Date of Patent: Dec. 10, 1991

[54] HIGH ACTIVITY VANADIUM-BASED CATALYST

[75] Inventor: Kevin J. Cann, Rocky Hill, N.J.

[73] Assignee: Union Carbide Chemicals and Plastics Technology Corporation, Danbury, Conn.

[21] Appl. No.: 631,942

[22] Filed: Dec. 21, 1990

[51] Int. Cl.$^5$ ............................................... C08F 4/68
[52] U.S. Cl. .................................... 502/119; 502/112; 502/120; 502/125; 526/129
[58] Field of Search ................ 502/112, 119, 120, 125

[56] References Cited

U.S. PATENT DOCUMENTS 4,426,317 1/1984 Rogers ................................. 502/120
4,508,842 4/1985 Beran et al. ......................... 502/112

FOREIGN PATENT DOCUMENTS 62-25112 2/1987 Japan .

*Primary Examiner*—Patrick P. Garvin
*Attorney, Agent, or Firm*—John S. Piscitello

[57] ABSTRACT

A vanadium-based catalyst system is treated with a boron alkoxide as a means of enhancing catalyst activity and polymer productivity.

16 Claims, No Drawings

HIGH ACTIVITY VANADIUM-BASED CATALYST

FIELD OF THE INVENTION

This invention relates to a vanadium-based catalyst suitable for producing ethylene polymers at enhanced levels of catalyst activity and polymer productivity.

BACKGROUND OF THE INVENTION

U.S. Pat. No. 4,508,842 discloses a highly active vanadium-containing catalyst system suitable for producing ethylene polymers comprising:
(A) a solid catalyst component consisting essentially of
 (1) an inorganic carrier, as support for
 (2) the reaction product of (a) a vanadium trihalide and (b) an electron donor, and
 (3) a boron halide or alkylaluminum modifier,
(B) an alkylaluminum cocatalyst, and
(C) a halohydrocarbon polymerization promoter.

U.S. Pat. No. 4,426,317 also discloses a vanadium-containing catalyst system for polymerizing ethylene, said catalyst system comprising:
(A) a solid catalyst component containing:
 (a) a vanadium compound,
 (b) an organometallic compound of a metal of Group III of the periodic table, and
 (c) an inorganic oxide support, and
(B) a trialkylaluminum cocatalyst.

According to this reference, the organoaluminum compound must be reacted with the inorganic oxide support.

Japanese Public Disclosure No. 62-25112 (Application Ser. No. 60-163525) likewise discloses a vanadium-containing catalyst composition useful in the Preparation of ethylene Polymers. Such position consists of:
(1) a solid catalyst component obtained by precipitating vanadium trihalide from an ether solution onto a silica and/or alumina carrier and then treating the product with an alkylaluminum,
(2) an alkylaluminum,
(3) an alkyl halide, and
(4) an alkoxy compound of silicon.

Unfortunately, the presence of the alkoxysilicon compound in such composition has been found to adversely affect polymer productivity.

SUMMARY OF THE INVENTION

In accordance with the present invention, it has now been discovered that ethylene polymers can be produced at enhanced levels of catalyst activity and polymer productivity employing a vanadium-based catalyst system comprising:
(A) a solid catalyst component consisting essentially of
 (1) a solid, particulate, porous inorganic carrier, as support for
 (2) the reaction product of (a) a vanadium trihalide and (b) an electron donor, and
 (3) a boron halide or alkyl-aluminum modifier,
(B) a triethylaluminum cocatalyst,
(C) a halohydrocarbon polymerization promoter, and
(D) a boron alkoxide activity enhancer having the formula:

$$R_nB(OR^1)_{3-n}$$

R and $R^1$ are alkyl radicals containing from 1 to 14 carbon atoms, which radicals may be the same or different, and n is an integer having a value of 0, 1 or 2.

DETAILED DESCRIPTION OF THE INVENTION

The vanadium-containing catalyst systems which contains a boron alkoxide activity enhancer in accordance with the present invention have been found to be significantly more active than like catalyst systems which do not contain such boron alkoxide. As a result, it is Possible to produce ethylene polymers at enhanced levels of catalyst activity and polymer productivity by the use of such catalyst systems. Surprisingly, however, this activity enhancement has been found to be peculiar to catalyst systems employing triethylaluminum as cocatalyst, and such activity enhancement is not obtained when other alkylaluminum compounds are employed as cocatalyst.

Catalyst component (A) consists essentially of:
(1) a solid, particulate, porous inorganic carrier, as support for
(2) the reaction product of (a) a vanadium trihalide and (b) an electron donor, and
(3) a boron halide or alkylaluminum modifier.

The vanadium trihalide which is reacted with the electron donor in the Preparation of catalyst component (A) is Preferable vanadium trichloride, although the halogen Present in said vanadium trihalide may be chlorine, bromine or iodine, or any mixture thereof.

The electron donor employed is a liquid, organic Lewis base in which the vanadium trihalide is soluble.

Suitable electron donors include alkyl esters of aliphatic and aromatic carboxylic acids, aliphatic ketones, aliphatic amines, aliphatic alcohols, aliphatic ethers and cycloaliphatic ethers. Particularly useful are alkyl esters of saturated aliphatic carboxylic acids containing from 1 to 4 carbon atoms; alkyl esters of aromatic carboxylic acids containing from 7 to 8 carbon atoms; aliphatic ketones containing from 3 to 6 carbon atoms, Preferably from 3 to 4 carbon atoms; aliphatic amines containing from 1 to 14 carbon atoms, preferably from 2 to 8 carbon atoms; aliphatic alcohols containing from 1 to 8 carbon atoms, preferably from 2 to 8 carbon atoms; aliphatic ethers containing from 2 to 8 carbon atoms, preferably from 4 to 5 carbon atoms; and cycloaliphatic ethers containing from 4 to 5 carbon atoms, preferably mono- or di- ethers containing 4 carbon atoms. The aliphatic and cycloaliphatic ethers are most preferred, particularly tetrahydrofuran. If desired, these electron donors may be substituted with one or more substituents which are inert under the reaction conditions employed during reaction with the vanadium trihalide, as well as during Preparation of and Polymerization with catalyst component (A).

The modifier employed in the preparation of catalyst component (A) is a boron halide or alkylaluminum compound having the formula:

$$MX_a$$

wherein:
M is boron or $AlR^2_{(3-a)}$ wherein each $R^2$ is an alkyl radical containing from 1 to 14 carbon atoms, which radicals may be the same or different, X is selected from the group consisting of fluorine, chlorine, bromine and iodine, and mixtures thereof, and a is an integer having a value of 0, 1 or 2, provided that a is 3 when M is boron.

Preferably any halide present in the modifier is chlorine, and any alkyl radicals present contain from 1 to 6 carbon atoms. Such alkyl radicals may be cyclic, branched or straight chain, and may be substituted with one or more substituents which are inert under the reaction conditions employed during Preparation of and polymerization with catalyst component (A). Diethylaluminum chloride is preferred.

A solid, particulate, porous inorganic material is employed as carrier in the preparation of catalyst component (A). The carrier serves as support for the vanadium trihalide/electron donor reaction Product, and the boron halide or alkylaluminum modifier. Suitable carriers include such materials as oxides of silicon, aluminum and zirconium, as well as phosphates of aluminum. Usually these materials have an average particle size of from about 10 microns to about 250 microns, Preferably from about 20 microns to about 150 microns, and a surface area of at least 3 square meters per gram, preferably at least 50 square meters per gram. Polymerization activity of the catalyst can be improved by employing a silica support having an average pore size of at least 80 Angstrom units, preferably at least 100 Angstrom units. The carrier material should be dry, that is, free of absorbed water. Drying of the carrier material can be effected by heating, e.g., at a temperature of at least 600° C. when silica is employed as the support.

Catalyst component (A) is prepared by treating a solid, particulate, porous inorganic carrier with:

(1) the reaction product of (a) a vanadium trihalide and (b) an electron donor, and (2) a boron halide or alkylaluminum modifier.

The vanadium trihalide/electron donor reaction product is Prepared by dissolving at least one vanadium trihalide in at least one electron donor at a temperature of from about 20° C. up to the boiling point of the electron donor. Dissolution of the vanadium trihalide in the electron donor can be facilitated by stirring, and in some instances by refluxing, the vanadium trihalide in the electron donor. Up to several hours of heating may be required to complete dissolution.

After the vanadium trihalide has been dissolved in the electron donor, the reaction product is impregnated into the carrier. Impregnation may be effected by adding the carrier to the solution of the vanadium trihalide in the electron donor, and then drying the mixture to remove excess electron donor. The carrier may be added alone as a dry powder or, if desired, as a slurry in additional electron donor. Alternatively, the solution of the vanadium trihalide in the electron donor may be added to the carrier. Ordinarily the carrier and the solution of the vanadium trihalide in the electron donor are mixed together in such amounts that, after drying, the impregnated carrier contains from about 0.05 mmole to about 1.0 mmole of vanadium per gram, preferably from about 0.3 mmole to about 0.8 mmole of vanadium Per gram, and most preferably from about 0.3 mmole to about 0.6 mmole of vanadium per gram. The impregnated vanadium trihalide/electron donor reaction product Prepared in this manner contains from about 1 mole to about 5 moles, preferably from about 2 moles to about 4 moles, and most preferably about 3 moles of electron donor per mole of vanadium trihalide.

Excess electron donor not actually complexed with the vanadium trihalide may remain adsorbed on the carrier without ill effects.

The boron halide or alkylaluminum modifier is usually added to the carrier after it has been impregnated with the vanadium trihalide/electron donor reaction product. However, if desired, the boron halide or alkylaluminum modifier may be added to the carrier before it is impregnated with the vanadium trihalide/electron donor reaction product. Addition of the modifier to the carrier may be effected by dissolving one or more modifiers in one or more inert liquid solvents capable of dissolving the modifier, immersing the carrier in the solution, and then drying the mixture to remove the solvent. If the modifier is applied subsequent to the vanadium trihalide/electron donor reaction product, the solvent must be one which does not dissolve the vanadium trihalide/electron donor reaction product. The carrier may be added to the solution of the modifier alone as a dry powder or, if desired, as a slurry in additional inert liquid solvent. Alternatively, the solution of the modifier may be added to the carrier. Ordinarily the carrier and the solution of the modifier in the inert liquid solvent are mixed together in such amounts that, after drying, the carrier contains from about 0.1 mole to about 10 moles, Preferably from about 1 mole to about 5 moles, of modifier per mole of vanadium trihalide/electron donor reaction Product Present in the carrier (or to be added to the carrier if it is applied subsequent to the modifier).

Among the solvents which can be employed to dissolve the boron halide or alkylaluminum modifier are hydrocarbon solvents such as isopentane, hexane, heptane, toluene, xylene and naphtha.

Component (B) of the catalyst system of the present invention is triethylaluminum. As previously noted, the activity enhancement of the catalyst system of the present invention is Peculiar to the use of triethylaluminum as cocatalyst, and no significant activity enhancement is obtained when cocatalysts other than triethylaluminum are employed.

Component (C) of the catalyst system of the present invention is a halohydrocarbon polymerization promoter having the formula $R^3_b CX'_{(4-b)}$ wherein:

R$^3$ is hydrogen or an unsubstituted or halosubstituted alkyl radical containing from 1 to 6 carbon atoms, which radicals may be the same or different, X' is halogen, and b is 0, 1 or 2.

Preferred promoters include flouro-, chloro- or bromo- substituted ethane or methane such as $CCl_4$, $CHCl_3$, $CH_2Cl_2$, $CBr_4$, $CFCl_3$, $CH_3CCl_3$, and $CF_2ClCCl_3$. Particularly preferred promoters are $CH_3CCl_3$, $CFCl_3$, and $CHCl_3$.

Component (D) of the catalyst system of the present invention is a boron alkoxide having the formula:

$R_n B(OR^1)_{3-n}$ wherein:

R and R$^1$ are alkyl radicals containing from 1 to 14 carbon atoms, which radicals may be the same or different, and n is an integer having a value of 0, 1 or 2.

Preferably R and R¹ are alkyl radicals containing from 1 to 6 carbon atoms. Such alkyl radicals may be cyclic, branched or straight chain, and may be substituted with one or more substituents which are inert under the reaction conditions employed during polymerization with the catalyst system of the present invention. Trimethyl borate and triethyl borate are preferred.

Polymerization is effected with the catalyst system of the present invention by contacting ethylene, or a mixture of ethylene and at least one alpha-olefin having 3 to 8 carbon atoms, with the four components of the catalyst system, i.e., the solid catalyst component, the triethylaluminum cocatalyst, the halohydrocarbon polymerization Promoter, and the boron alkoxide activity enhancer. Polymerization can be effected employing either solution, slurry or gas phase techniques. Suitable fluid bed reaction systems useful for gas phase polymerizations are described, e.g., in U.S. Pat. Nos. 4,302,565, 4,302,566 and 4,303,771, the disclosures of which are incorporated herein by reference.

The solid catalyst component, triethylaluminum cocatalyst, polymerization promoter, and boron alkoxide activity enhancer can be introduced into the polymerization reactor through separate feed lines or, if desired, two or more of the components may be partially or completely mixed with each other before they are introduced into the reactor. In any event, the triethylaluminum cocatalyst and polymerization promoter are employed in such amounts as to provide a molar ratio of the Promoter to the triethylaluminum cocatalyst of from about 0.1:1 to about 10:1, preferably from about 0.2:1 to about 2:1, and the triethylaluminum cocatalyst and the solid catalyst component are employed in such amounts as to provide an atomic ratio of aluminum in the cocatalyst to vanadium in the solid catalyst component of from about 10:1 to about 400:1, preferably from about 15:1 to about 60:1.

The amount of boron alkoxide employed in the catalyst system of the present invention depends upon the particular boron alkoxide employed and the degree of catalyst activity enhancement desired. Generally, at constant temperature, catalyst activity increases as the ratio of alkoxide groups in the boron alkoxide to aluminum atoms in the triethylaluminum cocatalyst increases. However, at a ratio of less than about 0.1:1, activity enhancement may be minimal. Further, enhancement of catalyst activity usually begins to diminish as the ratio approaches about 0.6:1, and finally at a ratio in excess of about 1.0:1, activity decreases to a level well below that of like catalysts which do not contain such boron alkoxide. For this reason, the boron alkoxide is generally employed in amounts such as to provide a ratio of alkoxide groups in the boron alkoxide to aluminum atoms in the triethylaluminum cocatalyst of from about 0.1:1 to about 0.6:1, preferably from about 0.3:1 to about 0.6:1. If polymerization is conducted in gas phase, e.g., in a fluidized bed, however, it may be desirable to employ somewhat greater amounts of boron alkoxide to obtain optimum results.

The triethylaluminum cocatalyst, polymerization promoter, and boron alkoxide activity enhancer may be introduced into the reactor dissolved in an inert liquid solvent, i.e., a solvent which is nonreactive with all the components of the catalyst system as well as all the components of the reaction system. Hydrocarbons such as isopentane, hexane, heptane, toluene, xylene, naphtha and mineral oil are preferred for this purpose. Generally, such solutions contain from 1 weight percent to 75 weight percent of these materials. If desired, less concentrated or more concentrated solutions can be employed, or, alternatively, the triethylaluminum cocatalyst, polymerization Promoter, and boron alkoxide activity enhancer can be added in the absence of solvent, or, if desired, suspended in a stream of liquefied monomer. When a solvent is employed and polymerization is conducted in gas phase, the amount of solvent introduced into the reactor should be carefully controlled so as to avoid the use of excessive quantities of liquid which would interfere with such polymerization.

The solvents employed to dissolve the triethylaluminum cocatalyst, Polymerization promoter, and boron alkoxide activity enhancer may also be employed to introduce the solid catalyst component into the reactor. Higher boiling solvents, such as mineral oil, are preferred for this Purpose. While the solid catalyst component may also be introduced into the reactor in the absence of solvent or suspended in liquefied monomer, such solvents may be employed to disperse the solid catalyst component and facilitate its flow into the reactor. Such dispersions generally contain from 1 weight percent to 75 weight percent of the solid catalyst component.

The alpha-olefins which may be polymerized with ethylene contain from 3 to 8 carbon atoms per molecule. These alpha-olefins should not contain any branching on any of their atoms closer than two carbon atoms removed from the double bond. Suitable alpha-olefins include propylene, butene-1, pentene-1, hexene-1, 4-methyl-pentene-1, heptene-1 and octene-1. The preferred alpha-olefins are propylene, butene-1, hexene-1, 4-methylpentene and octene-1.

The temperature employed during polymerization can vary from about 10° C. to about 115° C., Preferably from about 80° C. to about 110° C., when polymerization is effected in gas Phase or in a slurry, and from about 150° C. to about 250° C. when polymerization is effected in a solution. When polymerization is conducted in gas phase, the temperature, of course, must be maintained below the sintering temperature of the polymers produced in order to prevent polymer agglomeration. On the other hand, the temperature employed during gas phase polymerizations must be sufficiently elevated to prevent substantial condensation of the reaction mixture to the liquid state, as such condensation will cause the polymer Particles being produced to cohere to each other and likewise aggravate the polymer agglomeration problem. This difficulty is normally associated with the use of alpha-olefins having 5 or more carbon atoms which have relatively high dew points. While some minor condensation is tolerable, anything beyond this will cause reactor fouling.

The pressure employed can vary from subatmospheric to superatmospheric. Pressures of up to about 7000 kPa, preferably of from about 70 kPa to about 3500 kPa, are suitable for gas phase, slurry and solution polymerizations.

If desired, polymerization may be conducted in the presence of an inert gas, i.e., a gas which is nonreactive under the conditions employed during polymerization. A chain transfer agent, such as hydrogen, may also be present. The reactor should, however, be maintained substantially free of undesirable catalyst Poisons, such as moisture, oxygen, carbon monoxide, carbon dioxide, acetylene, and the like.

When polymerization is conducted in a fluid bed, the superficial gas velocity of the gaseous reaction mixture through the bed must exceed the minimum flow required for fluidization in order to maintain a viable fluidized bed.

The polymers produced with the catalyst system of the present invention have a melt index of from greater than 0 g/10 minutes to about 500 g/10 minutes, usually of from about 0.1 g/10 minutes to about 100 g/10 minutes. The melt index of a polymer varies inversely with its molecular weight and is a function of the hydrogen/monomer ratio employed in the reaction system, the Polymerization temperature, and the density of the polymer. Thus, the melt index is raised by increasing the hydrogen/monomer ratio, the polymerization temperature, and/or the ratio of higher alpha olefin to ethylene employed in the reaction system.

The polymers produced with the catalyst system of the present invention are also characterized by a density of from about 0.86 g/cm3 to about 0.96 g/cm3 Such polymers generally contain at least 50 mol percent of Polymerized ethylene and no more than 50 mol percent of polymerized alpha olefin containing from 3 to 8 carbon atoms and, optionally, polymerized diene. When polymerized diene is present, the polymers ordinarily contain from 0.01 mol percent to 10 mol percent of at least one such diene, from 6 mol Percent to 55 mol percent of at least one polymerized alpha olefin containing from 3 to 8 carbon atoms, and from 35 mol percent to 94 mol percent of polymerized ethylene.

The following Examples are designed to illustrate the process of the present invention and are not intended as a limitation upon the scope thereof.

The properties of the polymers produced in the Examples were determined by the following test methods:

Melt Index (MI)
ASTM D-1238, Condition E. Measured at 190° C. and reported as grams per 10 minutes.

Flow Index (FI)
ASTM D-1238, Condition F. Measured at 10 times the weight used in the melt index test above.

Melt Flow Ratio (MFR)
Ratio of Flow Index : Melt Index.

Activity
Activity values are normalized values based upon grams of polymer produced per mmol of vanadium in the catalyst per hour per 100 psi of ethylene polymerization pressure.

EXAMPLE 1

Impregnation of Carrier with $VCl_3$/THF Reaction Product

To a flask equipped with a mechanical stirrer were added 4 liters of anhydrous tetrahydrofuran (THF), followed by 64 grams (0.406 mole) of solid $VCl_3$. The mixture was heated under nitrogen at a temperature of 65° C. for 5 hours with continuous stirring in order to completely dissolve the $VCl_3$.

Eight hundred grams (800 g) of silica gel were dehydrated by heating under nitrogen at a temperature of 600° C. for 20 hours. The dehydrated gel was added to the solution prepared as above, and the mixture was refluxed for one hour under nitrogen. At the end of this time, the mixture was heated at a temperature of 55° C. for about 6 hours under a purge of dry nitrogen to produce a dry, free-flowing powder containing about 8 weight percent THF.

EXAMPLE 2

Treatment of Carrier with Diethylaluminum Chloride

Five hundred grams (500 g) of the silica carrier impregnated with $VCl_3$/THF reaction product in accordance with Example 1 were slurried in 4 liters of anhydrous hexane. The slurry was continuously stirred while a 10 weight percent solution of diethylaluminum chloride is anhydrous hexane was added over a period of 30 minutes. The impregnated carrier and the diethylaluminum chloride solution were employed in amounts that provided an atomic ratio of aluminum to vanadium of 2.5:1. After addition of the diethylaluminum chloride solution was complete, the mixture was heated at a temperature of 45° C. for about 6 hours under a purge of dry nitrogen to produce a dry, free-flowing powder.

EXAMPLE 3-10

Copolymerization of Ethylene with Hexene-1

Examples 3-10 illustrate the copolymerization of ethylene with hexene-1 using the catalyst system of the present invention.

EXAMPLES 3-7

The solid catalyst component prepared as described in Example 2 was employed together with triethylaluminum, as cocatalyst; chloroform ($CHC_{l3}$), as polymerization promoter; and triethyl borate, as activity enhancer, to copolymerize ethylene and hexene-1 in a one-liter autoclave reactor.

In each of these Examples, the four catalyst components were pre-mixed in a 6 ounce bottle before being added to the reactor. The solid catalyst component was added to the bottle first, followed by the triethylaluminum cocatalyst (as a 25 weight percent solution in hexane), the triethyl borate activity enhancer, and the chloroform polymerization promoter. Anhydrous conditions were maintained at all times.

The polymerization reactor was dried by heating at 96° C. under a stream of dry nitrogen for 20 minutes. After cooling the reactor to 50° C., 500 ml of hexane were added to the reactor, followed by twenty milliliters (20.0 ml) of hexene-1. The reactor contents were stirred under a gentle flow of nitrogen, the premixed catalyst components were transferred to the reactor, and the reactor was sealed. The temperature of the reactor was gradually raised to 70° C. and the reactor was pressurized to a pressure of 30 kPa with hydrogen and then to 1050 kPa with ethylene. Heating was continued until the desired polymerization temperature of 85° C. was attained. Polymerization was allowed to continue for 30 minutes, during which time ethylene was continually added to the reactor to maintain the pressure constant. At the end of 30 minutes, the reactor was vented and opened.

Table II below sets forth the details involving the composition of the catalysts employed in these polymerizations, as well as the reaction conditions employed during polymerization, the Properties of the polymers produced, and the productivity of each Catalyst system.

Shorthand designations employed in Tables II and III are defined as follows:

TABLE I

| Designation | Definition |
| --- | --- |
| THF | Tetrahydrofuran |
| DEAC | Diethylaluminum chloride |

TABLE I-continued

| Designation | Definition |
|---|---|
| TEAL | Triethylaluminum |
| TIBA | Triisobutylaluminum |
| TEB | Triethyl borate |
| TMB | Trimethyl borate |

EXAMPLES 8–10

The solid catalyst component Prepared as described in Example 2 was employed together with triethylaluminum, as cocatalyst; chloroform ($CHCl_3$), as polymerization promoter; and trimethyl borate, as activity enhancer, to copolymerize ethylene and hexene-1 in a one-liter autoclave reactor.

The procedure employed in Examples 8–10 was identical to that of Examples 3–7 except that trimethyl borate was substituted for triethyl borate.

COMPARATIVE EXAMPLE A

For comparative purposes, ethylene was copolymerized with hexene-1 as in Examples 3–10 except that the use of a boron alkoxide activity enhancer was omitted. The details of this polymerization are set forth in Table II below along with the details of Examples 3–10.

COMPARATIVE EXAMPLES B–E

In Comparative Example B, ethylene was copolymerized with hexene-1 as in Comparative Example A except that triisobutylaluminum was employed as cocatalyst instead of triethylaluminum.

In Comparative Examples C–E, the procedure was repeated employing various amounts of triethyl borate as an activity enhancer.

The details of these polymerizations are set forth in Table II below.

It is apparent from Comparative Examples B–E that, at best, only a minor activity gain is obtained by the use of a boron alkoxide activity enhancer when triisobutylaluminum is employed as cocatalyst. As is apparent from the data in Table II, however, the effect is quite different when a boron alkoxide activity enhancer is employed together with a triethylaluminum cocatalyst.

TABLE II

Copolymerization of Ethylene and Hexene-1

| EXAMPLE | Comp. Exp. A | 3 | 4 | 5 | 6 | 7 | 8 |
|---|---|---|---|---|---|---|---|
| Catalyst | | | | | | | |
| Carrier | $SiO_2$ | $SiO_2$ | $SiO_2$ | $SiO_2$ | $SiO_2$ | $SiO_2$ | $SiO_2$ |
| Precursor | $VCl_3$/THF | $VCl_3$/THF | $VCl_3$/THF | $VCl_3$/THF | $VCl_3$/THF | $VCl_3$/THF | $VCl_3$/THF |
| Mmol Vanadium in Precursor | 0.023 | 0.017 | 0.018 | 0.017 | 0.017 | 0.020 | 0.017 |
| Modifier | DEAC | DEAC | DEAC | DEAC | DEAC | DEAC | DEAC |
| Modifier/V Ratio | 2.5 | 2.5 | 2.5 | 2.5 | 2.5 | 2.5 | 2.5 |
| Cocatalyst | TEAL | TEAL | TEAL | TEAL | TEAL | TEAL | TEAL |
| Al/V Ratio | 40 | 40 | 40 | 40 | 40 | 40 | 40 |
| Promoter | $CHCl_3$ | $CHCl_3$ | $CHCl_3$ | $CHCl_3$ | $CHCl_3$ | $CHCl_3$ | $CHCl_3$ |
| Promoter/Al Ratio | 1.0 | 1.0 | 1.0 | 1.0 | 1.0 | 1.0 | 1.0 |
| Activity Enhancer | — | TEB | TEB | TEB | TEB | TEB | TMB |
| Activity Enhancer/Al Ratio | — | 0.100 | 0.150 | 0.180 | 0.180 | 0.200 | 0.150 |
| Alkoxide/Al Ratio | — | 0.300 | 0.450 | 0.540 | 0.540 | 0.600 | 0.450 |
| Activity Enhancer/V Ratio | — | 4 | 6 | 7 | 7 | 8 | 6 |
| Reactions Conditions | | | | | | | |
| Temperature, °C. | 85 | 85 | 85 | 85 | 85 | 85 | 85 |
| Pressure, kPa | 1050 | 1050 | 1050 | 1050 | 1050 | 1050 | 1050 |
| Reaction time, minutes | 30 | 30 | 30 | 30 | 30 | 30 | 30 |
| Polymer Properties | | | | | | | |
| Melt Index, g/10 min. | 1.6 | 0.2 | 1.7 | 0.2 | 19 | 0.2 | 2.1 |
| Flow Index, g/10 min. | 88 | 13 | 184 | 22 | 962 | 19 | 112 |
| Melt Flow Ratio | 55 | 65 | 108 | 110 | 51 | 95 | 53 |
| Activity | | | | | | | |
| g polymer/mmol V-Hr-100 psi $C_2H_4$ | 3730 | 5776 | 6181 | 6828 | 6184 | 5899 | 5653 |
| Activity Increase vs. Control, % | — | 55 | 66 | 83 | 66 | 58 | 52 |

| EXAMPLE | 9 | 10 | Comp. Exp. B | Comp. Exp. C | Comp. Exp. D | Comp. Exp. E |
|---|---|---|---|---|---|---|
| Catalyst | | | | | | |
| Carrier | $SiO_2$ | $SiO_2$ | $SiO_2$ | $SiO_2$ | $SiO_2$ | $SiO_2$ |
| Precursor | $VCl_3$/THF | $VCl_3$/THF | $VCl_3$/THF | $VCl_3$/THF | $VCl_3$/THF | $VCl_3$/THF |
| Mmol Vanadium in Precursor | 0.018 | 0.019 | 0.019 | 0.017 | 0.017 | 0.018 |
| Modifier | DEAC | DEAC | DEAC | DEAC | DEAC | DEAC |
| Modifier/V Ratio | 2.5 | 2.5 | 2.5 | 2.5 | 2.5 | 2.5 |
| Cocatalyst | TEAL | TEAL | TIBA | TIBA | TIBA | TIBA |
| Al/V Ratio | 40 | 40 | 40 | 40 | 40 | 40 |
| Promoter | $CHCl_3$ | $CHCl_3$ | $CHCl_3$ | $CHCl_3$ | $CHCl_3$ | $CHCl_3$ |
| Promoter/Al Ratio | 1.0 | 1.0 | 1.0 | 1.0 | 1.0 | 1.0 |
| Activity Enhancer | TMB | TMB | — | TEB | TEB | TEB |
| Activity Enhancer/Al Ratio | 0.200 | 0.250 | — | 0.050 | 0.150 | 0.250 |
| Alkoxide/Al Ratio | 0.600 | 0.750 | — | 0.150 | 0.450 | 0.750 |
| Activity Enhancer/V Ratio | 8 | 10 | — | 2 | 6 | 10 |
| Reactions Conditions | | | | | | |
| Temperature, °C. | 85 | 85 | 85 | 85 | 85 | 85 |
| Pressure, kPa | 1050 | 1050 | 1050 | 1050 | 1050 | 1050 |
| Reaction time, minutes | 30 | 30 | 30 | 30 | 30 | 30 |
| Polymer Properties | | | | | | |
| Melt Index, g/10 min. | 1.0 | 35 | 0.5 | 0.3 | 0.1 | 6.4 |
| Flow Index, g/10 min. | 59 | 984 | 54 | 43 | 19 | 323 |

TABLE II-continued

| Copolymerization of Ethylene and Hexene-1 | | | | | | |
|---|---|---|---|---|---|---|
| Melt Flow Ratio | 59 | 28 | 108 | 143 | 190 | 50 |
| Activity | | | | | | |
| g polymer/mmol V-Hr-100 psi $C_2H_4$ | 5792 | 1971 | 6030 | 6644 | 6120 | 5355 |
| Activity Increase vs. Control, % | 55 | −47 | — | 10 | 1 | −11 |

EXAMPLE 11

Homopolymerization of Ethylene

The solid catalyst component prepared as described in Example 2 was employed together with triethylaluminum, as cocatalyst; chloroform ($CHCl_3$), as polymerization promoter; and triethyl borate, as activity enhancer, to homopolymerize ethylene in a one-liter autoclave reactor.

The procedure employed in Example 11 was identical to that of Examples 3-7 except that ethylene was homopolymerized rather than copolymerized.

Table III below sets forth the details involving the composition of the catalyst employed in this polymerization, as well as the reaction conditions employed during polymerization, the Properties of the Polymer produced, and the productivity of the catalyst system.

COMPARATIVE EXAMPLE F

For comparative purposes, ethylene was homopolymerized as in Example 11 except that the use of triethyl borate was omitted. The details of this Polymerization are set forth in Table III below with the details of Example 11.

TABLE III

| | Homopolymerization of Ethylene | |
|---|---|---|
| EXAMPLE | Comp. Exp. F | 11 |
| Catalyst | | |
| Carrier | $SiO_2$ | $SiO_2$ |
| Precursor | $VCl_3$/THF | $VCl_3$/THF |
| Mmol Vanadium in Precursor | 0.022 | 0.022 |
| Modifier | DEAC | DEAC |
| Modifier/V Ratio | 2.5 | 2.5 |
| Cocatalyst | TEAL | TEAL |
| Al/V Ratio | 40 | 40 |
| Promoter | $CHCl_3$ | $CHCl_3$ |
| Promoter/Al Ratio | 1.0 | 1.0 |
| Activity Enhancer | — | TEB |
| Activity Enhancer/Al Ratio | — | 0.180 |
| Alkoxide/Al Ratio | — | 0.540 |
| Activity Enhancer/V Ratio | — | 7 |
| Reactions Conditions | | |
| Temperature, °C. | 85 | 85 |
| Pressure, kPa | 1050 | 1050 |
| Reaction time, minutes | 30 | 30 |
| Polymer Properties | | |
| Melt Index, g/10 min. | 10 | 1.5 |
| Flow Index, g/10 min. | 511 | 78 |
| Melt Flow Ratio | 51 | 52 |
| Activity | | |
| g polymer/mmol V-Hr-100 psi $C_2H_4$ | 2029 | 3039 |
| Activity Increase vs. Control, % | — | 50 |

I claim:

1. A catalyst system comprising:
   (A) a solid catalyst component consisting essentially of
   (1) a solid, particulate, porous inorganic carrier, as support for
   (2) the reaction product of (a) a vanadium trihalide and (b) an electron donor, and
   (3) a boron halide or alkylaluminum modifier,
   (B) a triethylaluminum cocatalyst,
   (C) a halohydrocarbon polymerization promoter, and
   (D) a boron alkoxide activity enhancer having the formula:

$R_nB(OR^1)_{3-n}$ wherein:
   R and $R^1$ are alkyl radicals containing from 1 to 14 carbon atoms, which radicals may be the same or different, and
   n is an integer having a value of from 0, 1 or 2,
   said boron alkoxide activity enhancer being present in an amount sufficient to provide a ratio of alkoxide groups in such boron alkoxide to aluminum atoms in the triethylaluminum cocatalyst of from 0.1:1 to 0.6:1.

2. A catalyst system as in claim 1 wherein R and $R^1$ are alkyl radicals containing from 1 to 6 carbon atoms.

3. A catalyst system as in claim 1 wherein the boron alkoxide activity enhancer is triethyl borate.

4. A catalyst system as in claim 1 wherein the boron alkoxide activity enhancer is trimethyl borate.

5. A catalyst system as in claim 1 wherein the boron alkoxide activity enhancer is present in an amount sufficient to provide a ratio of alkoxide groups in such boron alkoxide to aluminum atoms in the triethylaluminum cocatalyst of from 0.3:1 to 0.6:1

6. A catalyst system as in claim 5 wherein R and $R^1$ are alkyl radicals containing from 1 to 6 carbon atoms.

7. A catalyst system as in claim 5 wherein the boron alkoxide activity enhancer is triethyl borate.

8. A catalyst system as in claim 5 wherein the boron alkoxide activity enhancer is trimethyl borate.

9. In a catalyst system comprising:
   (A) a solid catalyst component consisting essentially of
   (1) a solid, particulate, porous inorganic carrier, as support for
   (2) the reaction product of (a) a vanadium trihalide and (b) an electron donor, and
   (3) a boron halide or alkylaluminum modifier,
   (B) a triethylaluminum cocatalyst, and
   (C) a halohydrocarbon polymerization promoter,
   the improvement wherein a boron alkoxide activity enhancer is present in the catalyst system, said boron alkoxide having the formula:

$R_nB(OR^1)_{3-n}$ wherein:
   R and $R^1$ are alkyl radicals containing from 1 to 14 carbon atoms, which radicals may be the same or different, and
   n is an integer having a value of from 0, 1 or 2,
   said boron alkoxide activity enhancer being present in an amount sufficient to Provide a ratio of alkoxide groups in such boron alkoxide to aluminum atoms in the triethylaluminum cocatalyst of from 0.1:1 to 0.6:1.

10. A catalyst system as in claim 9 wherein R and R$^1$ are alkyl radicals containing from 1 to 6 carbon atoms.

11. A catalyst system as in claim 9 wherein the boron alkoxide activity enhancer is triethyl 12. A catalyst system as in claim 9 wherein the boron alkoxide activity enhancer is trimethyl 13. A catalyst system as in claim 9 wherein the boron alkoxide activity enhancer is present in an amount sufficient to provide a ratio of alkoxide groups in such boron alkoxide to aluminum atoms in the triethylaluminum cocatalyst of from 0.3:1 to 0.6:1.

14. A catalyst system as in claim 13 wherein R and R$^1$ are alkyl radicals containing from 1 to 6 carbon atoms.

15. A catalyst system as in claim 13 wherein the boron alkoxide activity enhancer is triethyl borate.

16. A catalyst system as in claim 13 wherein the boron alkoxide activity enhancer is trimethyl borate.

* * * * *